United States Patent [19]

Kalaskie et al.

[11] Patent Number: 4,776,562

[45] Date of Patent: Oct. 11, 1988

[54] DUAL PISTON PNEUMATICALLY OPERATED VALVE

[75] Inventors: William S. Kalaskie, McMurray; David E. Hughes, Pittsburgh, both of Pa.

[73] Assignee: Stanley G. Flagg & Co., Washington, D.C.

[21] Appl. No.: 78,826

[22] Filed: Jul. 28, 1987

[51] Int. Cl.⁴ .............................................. F16K 31/122

[52] U.S. Cl. ........................................ 251/63.4; 92/63; 92/152; 251/63.5

[58] Field of Search .................. 251/63.4, 63.5; 92/63, 92/152

[56] References Cited

U.S. PATENT DOCUMENTS

| | | | |
|---|---|---|---|
| 1,743,620 | 1/1930 | Quiroz et al. . | |
| 3,387,496 | 6/1968 | Broerman . | |
| 3,451,423 | 6/1969 | Priese . | |
| 3,741,245 | 6/1973 | West . | |
| 3,980,270 | 9/1976 | Thomas | 251/63.4 X |
| 4,112,766 | 8/1978 | Ragains . | |
| 4,276,907 | 7/1981 | Broerman . | |
| 4,316,482 | 2/1982 | Pearce . | |
| 4,335,744 | 6/1982 | Bey | 251/63.5 X |
| 4,526,341 | 7/1985 | Thomas . | |
| 4,706,929 | 11/1987 | Kalaskie | 251/63.5 X |

FOREIGN PATENT DOCUMENTS

| | | | |
|---|---|---|---|
| 1358512 | 3/1964 | France | 251/63.4 |

*Primary Examiner*—Robert G. Nilson

*Attorney, Agent, or Firm*—Walter J. Blenko, Jr.; Richard V. Westerhoff

[57] ABSTRACT

A gas cylinder valve for high pressure gas cylinders includes a pneumatic actuator with tandem pistons which are operated by normal industry "house" pneumatic pressures to overcome the large closing bias force generated by a set of disc springs so that the valve opening spring can lift the valve stem from its seat. A floating pressure plate which seats against an annular internal shoulder in the actuator housing prevents pneumatic pressure applied to the upper piston from acting on the back of the lower piston. Pneumatic pressure from a common source is applied to both pistons through an axial hole in a piston rod integral with one piston and bearing against the other piston. The actuator is easily assembled by merely inserting the lower piston, the pressure plate, the upper piston and the disc springs into the open end of a cup-shaped housing, and securing them in place with a preload on the springs by screwing on a housing cover.

12 Claims, 2 Drawing Sheets

DUAL PISTON PNEUMATICALLY OPERATED VALVE

BACKGROUND OF THE INVENTION

1. Field of the Invention

This invention relates to pneumatically operated valves for controlling the flow of high pressure gases and more particularly to such valves which can be operated by commercially available pneumatic pressures at or below 100 psig. Such valves are particularly suitable as compressed gas cylinder valves.

2. Background Information

Our commonly owned U.S. patent application Ser. No. 06/938,824 filed on Dec. 8, 1986 now U.S. Pat. No. 4,706,929, discloses a pneumatically operated valve particularly suitable for use with compressed gas cylinders. The pneumatic actuator in that valve is designed for interchangeable use with the common manual actuators which have been in service for many years. That pneumatic actuator includes a cup shaped housing which screws into the conventional valve body. A valve stem extension protrudes into the housing and bears against a piston which is biased against the valve stem extension by a stack of disc springs. The force applied by the disc springs to the valve stem extension through the piston, biases the valve to the closed position. Pneumatic pressure introduced into the actuator applies a force to the piston to compress the disc springs. This allows a valve spring to move the valve stem to the open position.

The gas cylinders with which such pneumatically operated valves are used are typically charged to pressures as high as 2000 psig. To assure that the gas cylinder does not leak at such high pressures, a substantial force must be generated by the disc springs. This is particularly important where such gas cylinders are used to store highly toxic gases used for example in the semiconductor industry. It is also desirable that the actuator be of a size which fits under the conventional transport cap used during shipment and storage of the gas cylinders. Such constraints have necessitated that a pneumatic pressure of about 160 PSI be used to operate the pneumatic actuator. Since the typical house pressure found in industry is about 90 PSI, a separate pneumatic system or intensifiers are needed to operate our present pneumatically actuated cylinder valve.

Accordingly, it is a primary object of the invention to provide a pneumatically actuated cylinder valve and an actuator therefore which can be operated at normally available house pressures.

It is another important object of the invention to provide such a valve and an actuator which will ensure valve shut off on a full gas cylinder.

It is another important object of the invention to provide such a valve and actuator which can be used interchangeably with the commonly available manual actuators and which will fit under the conventional transport caps.

It is also an object of the invention to provide such a valve and actuator which are durable and reliable and which can be manufactured and assembled easily and economically.

SUMMARY OF THE INVENTION

These and other objects are realized by the invention which includes a pneumatic actuator with dual tandem pistons. A pressure plate between the pistons allows pressure to be applied to the upper piston without permitting pressure to act against the topside of the lower piston. Preferably, the pressure plate floats for ease in installation, but seats against a stop when pressure is applied.

More particularly, the invention includes a pneumatic actuator separately and in combination with a cylinder valve. The actuator includes a cup-shaped or hollow cylindrical housing with an end wall which is secured to the cylinder valve body. The valve stem member of the cylinder valve which is biased to the open position by a valve opening spring extends into the actuator housing through an aperture in the end wall. A first, lower piston slidable in the housing bears against the valve stem member and forms a first and separate pressurized actuator chamber with the end wall. A second, upper piston slidable in the housing forms with a pressure plate disposed between the pistons a second and separate pressurized actuator chamber. A biasing force applied to the upper piston by biasing means, such as disc springs, is transmitted to the lower piston by means extending between the pistons such as a piston rod. This biasing force is applied through the lower piston to the valve stem member to bias the valve to the closed position. The member extending between the pistons defines a passage through which the first and second actuator chambers communicate. Thus, pressurized fluid introduced into one of the chambers passes through this passageway into the other chamber, thereby exerting a force against both pistons which overcomes the bias force generated by the biasing means and moves the pistons away from the valve stem member so that the valve opening spring can open the valve.

Preferably, the actuator housing is a cup-shaped member with an integral end wall. Also, the pressure plate floats in the housing, but is restrained in the direction toward the first piston by stop means, such as an internal shoulder in the cylindrical housing. Seals are provided between the pistons and the housing, and between the pressure plate and the housing and the pressure plate and the rod extending between the pistons. The pressure plate and the lower piston form a bleed chamber which is vented to atmosphere to bleed off any pressure buildup in that volume.

In the preferred embodiment of the invention, the piston rod is integral with the lower piston and bears against the upper piston. A transverse slot on the end of the rod forms a flow path between the rod and the upper piston through which fluid can pass from the passage in the piston rod into the upper actuator chamber. The piston rod is dimensioned such that the lower piston seats against the end wall before the upper piston seats against the pressure plate so that no direct mechanical force can ever be applied to the pressure plate.

With this double piston arrangement, the valve can be operated with normally available house pneumatic pressures, yet the entire valve, including the actuator, fits under the normal cylinder valve transport cap. In addition, with the above arrangement the actuator is easily assembled by merely inserting the successive parts through the open end of the housing, and securing them in place with a screw-on cap.

BRIEF DESCRIPTION OF THE DRAWINGS

A full understanding of the invention can be gained from the following description of the preferred embodiments when read in conjunction with the accompanying drawings in which.

DESCRIPTION OF A PREFERRED EMBODIMENT

Figure 1:
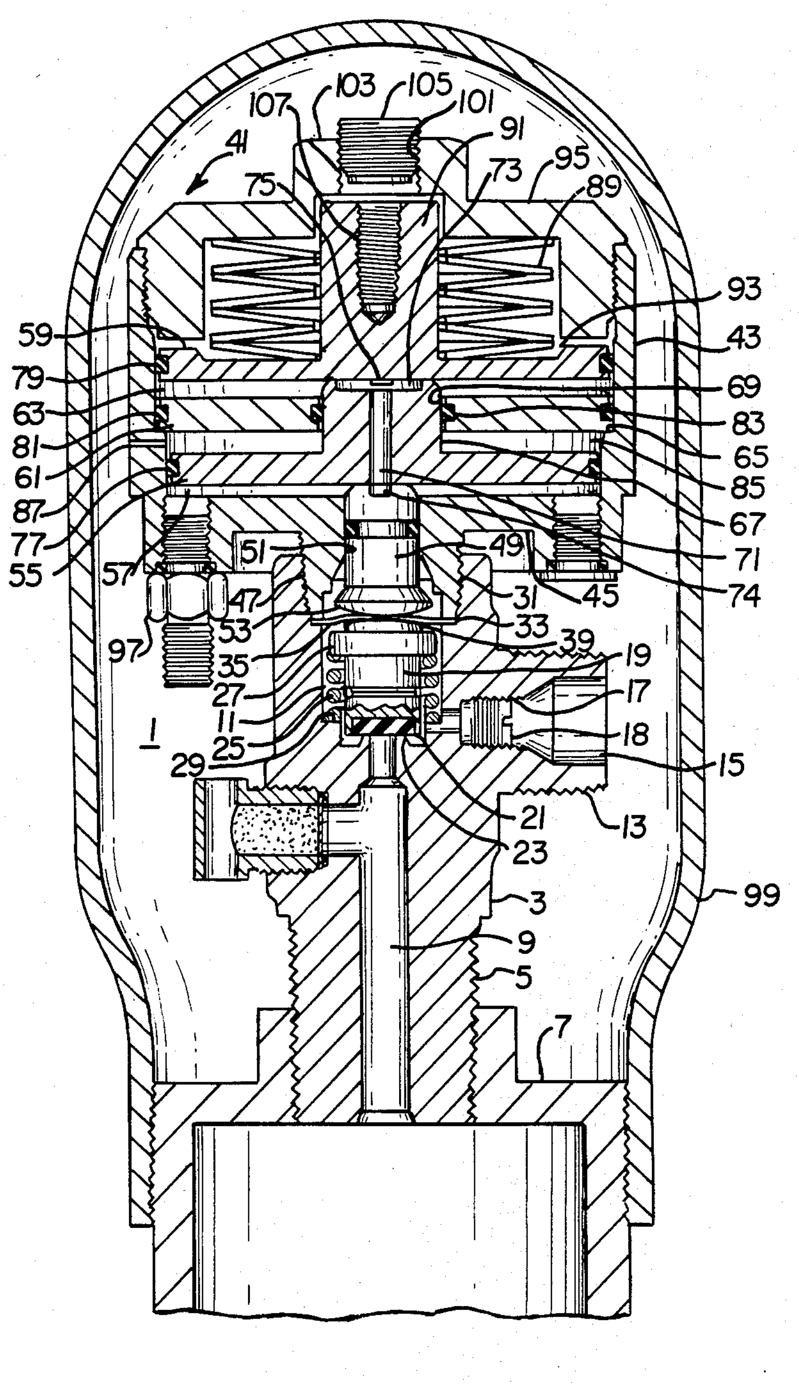
FIG. 1 is a vertical section through a cylinder valve in accordance with the invention shown in place on a gas cylinder with the valve in the closed position and transport cap in place.

The invention is particularly suited for incorporation in valves for high pressure gas cylinders and will be so described, however, features of the invention are applicable to other types of valves also. Turning to the drawings, a valve 1 incorporating the invention includes a valve body 3 having external threads 5 on one end for securing the valve in the inlet of a high pressure gas cylinder 7. A longitudinal bore in the valve body 3 forms an inlet passage 9 which communicates with a counter bore extending inward from the opposite end of the valve body to form a valve chamber 11. A transverse, flared bore through the valve body 3 and an externally threaded boss 13 forms an outlet passage 15 which communicates with the valve chamber 11. The outlet passage 15 is also provided with internal threads 17 for receiving an optional flow restrictor 18. The threaded boss 13 is sized to form an appropriate Compressed Gas Association (CGA) connector for the gas being delivered. Standard connection designs are assigned to each gas to avoid misconnections which could result in hazardous conditions.

Figure 2:
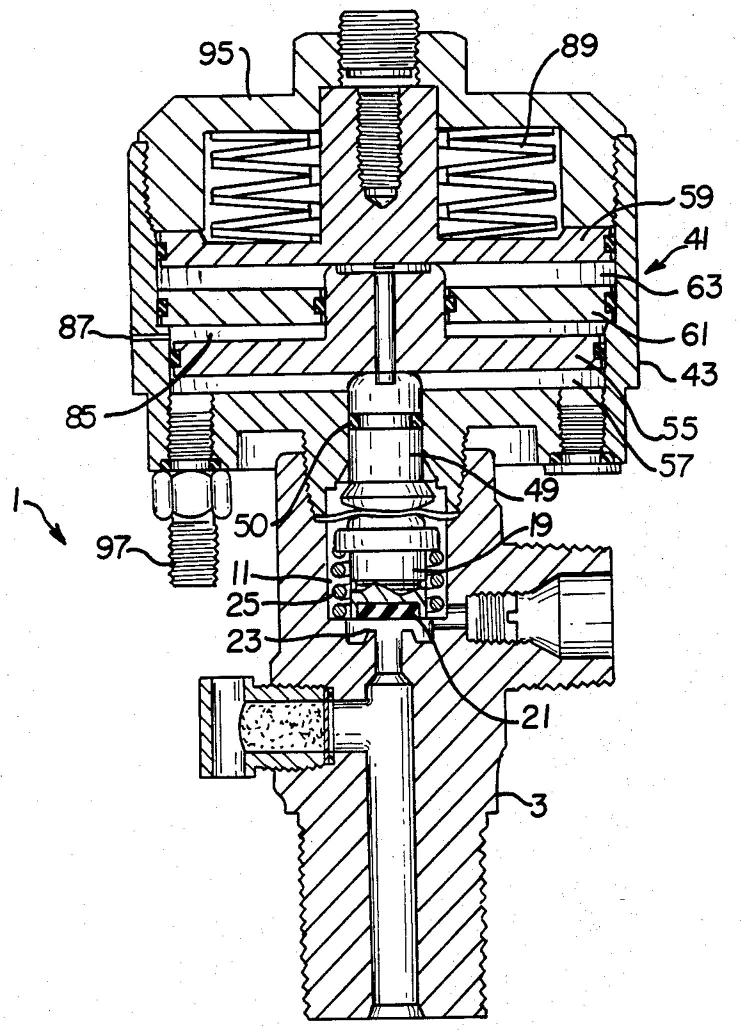
FIG. 2 is a similar vertical section through the cylinder valve of FIG. 1 with the valve in the open position.

A cylindrical inner valve stem 19 longitudinally slidable in the valve chamber 11 is recessed at the lower end to receive a valve seat insert 21 which seals against a raised valve seat 23 surrounding the intersection of the inlet passage 9 with the valve chamber 11. A helical compression spring 25 bears against a radially outwardly extending flange 27 on the inner stem 19 and the shoulder 29 in the bottom of the valve chamber 11 to bias the inner valve stem 11 to the open position shown in FIG. 2. A threaded counterbore 31 forms a shoulder 33 in the valve body 3 concentric with the valve chamber 11. A diaphragm member comprising a set of diaphragms 35 seats against this shoulder 33. The number of diaphragms in a set will vary as a function of valve size, choice of materials, design pressure, et cetera. The diaphragms 35 seal off the valve chamber 11 and bear against the rounded upper end 39 of the inner valve stem 19.

The portion of the valve 1 described to this point has been used for many years with a handwheel which is described and shown in our above mentioned patent application. Such a handwheel can be removed and replaced by the pneumatic actuator 41 incorporating the present invention. The pneumatic actuator 41 includes a hollow cylindrical housing 43 with an end wall 45. Preferably, the end wall 45 is formed integrally with the cylindrical side walls to provide a cup shaped housing. A threaded nipple 47 extending axially from the end wall 45 forms a connection for securing the actuator 41 to the valve body 3. In addition, screwing the threaded nipple 7 into threaded counter bore 31 in the valve body 3 clamps the diaphragms 35 against shoulder 33 to form a gas tight seal for the valve Chamber 11.

An outer valve stem 49, which together with inner valve stem 19 forms a valve stem member which opens and closes the valve, extends through an aperture 51 in the nipple 47 and end wall 45 into the hollow cylindrical housing 43. A convex surface 53 on the inner end of the outer valve stem bears against the diaphragms 35. An "0" ring 50 forms a seal around the outer valve stem 49.

A first lower piston 55 slidable in the housing 43 forms with the side walls of the housing and the end wall 45 a first lower actuator chamber 57. A second upper piston 59 forms with a pressure plate 61, a second actuator chamber 63 within the housing 43. The pressure plate 61 floats in the housing but seats against stop means, preferably in the form of an annular shoulder 65 in the inner wall of the housing 43. The stop spaces the pressure plate 61 from the lower piston and fixes the boundary of the upper actuator chamber 63 at a minimum distance from the end wall. As will be seen, this pressure plate prevents pneumatic pressure from being applied to the back of the lower piston 55.

A short piston rod 67 extends between the pistons 55 and 61 and slidably, passes through an aperture 69 in the pressure plate 61. Preferably, the piston rod 67 is formed integrally with the first piston 55 and merely bears against the second piston 61. A central axial bore 71 through the piston 55 and piston rod 67 counterbored at 73 provides a passage which interconnects the first and second actuator chambers 57 and 63. A transverse slot 75 in the end of the piston rod 67 provides a flow path through which compressed air or nitrogen can flow between the actuator chambers with the piston rod bearing against the second piston 59. A similar transverse slot 74 in the end of the outer valve stem 49 provides a passage between the first actuator chamber 57 and the bore 71.

"0" ring seals 77 and 79 form sliding seals between the pistons 55 and 59 respectively and the housing 43. Additional "0" ring seals 81 and 83 seal the pressure plate 61 against the housing 43 and piston rod 67 respectively. Any compressed air or nitrogen which might leak past the pressure plate 61 into a bleed chamber 85 between the pressure plate and the first piston 55 is vented to atmosphere through a bleed port 87 to prevent build up of pressure on the back of the piston 55.

A number of disc springs 89 are stacked over a boss 91 extending axially from the second piston 59 in a direction away form the end wall 45. The disc springs seat in a recess 93 in the piston and bear against a housing cover 95 which preferably screws into the free end of the cylindrical housing 43.

The disc springs 89, which are preloaded by the housing cover 95, apply a bias force to the second piston 59 which is transmitted through the piston rod 67, the first piston 55, the outer valve stem 49, and the diaphragms 35 to the inner valve stem 19. The closing force applied to the inner valve stem 19 by the disc springs 89 is much greater then the sum of the opening forces generated by the spring 25 and the compressed gas in the gas cylinder so that the valve is biased to the closed position shown in FIG. 1. The number and size of the disc springs 89 are selected to assure closure of the valve with the expected pressures within the gas cylinder, including margins for overpressures. Thus, the springs may be changed in number and stiffness to suit specific applications.

To open the valve, compressed air or nitrogen is introduced into the lower actuator chamber through a fitting 97. The pneumatic pressure in chamber 57 exerts a force on the piston 55 opposing the bias force generated by the disc springs 89. The compressed air or nitrogen also flows through the slot 74, bore 71, counterbore 73 and slot 75 into the upper actuator chamber 63 where it also exerts a force against the upper piston 59 opposing the spring bias force. The pressure plate 61 prevents the pressure applied to the second piston 59 from also being applied to the back of the lower piston 55, so that the forces applied to the two pistons are combined to overcome the closing force generated by the disc springs 89. This relieves the force applied through the first piston 55 to the outer valve stem 49 and permits the spring 25 to lift the lower valve stem off of the valve seat 23 thereby opening the valve.

The combined force generated by pneumatic pressure acting against the two pistons is sufficient to overcome the closing force generated by the disc springs with the typical house pneumatic pressures of about 90 psi. This result is acheived with an actuator that is smaller in diameter than the single piston actuator disclosed in our copending patent application. The smaller diameter actuator provides additional clearance between the actuator housing and the conventional transport cap 99 which is screwed onto the gas cylinder over the valve to protect the valve during shipment and storage.

Like the actuator disclosed in our copending application, the present actuator includes a threaded bore 101 in a boss 103 in the center of the housing cover 95. Locking plug 105 screwed into this bore bears against the boss 91 on the upper piston 59 to mechanically clamp to the valve in the closed position for shipment and storage of the gas cylinder. As also provided in the actuator disclosed in our copending patent application, a threaded bore 107 in the boss 91 can receive a jacking tool (not shown) which bears against the top of the housing cover 95 and lifts the piston 59 against the valve closing force generated by the disc springs 89 so that the valve opening spring 25 can open the valve. In this manner, the valve can be opened manually, without pneumatic pressure.

The pneumatic actuator in accordance with the invention can be used interchangably with conventional manual actuators that are used with a common type of gas cylinder valve. In addition, this actuator can be easily assembled by inserting the lower piston 55, the pressure plate 61, the upper piston 59 and the disc springs 89 into the open end of the cup-shaped housing 43, and securing them in place with the housing cover 95. The pressure plate 61 does not have to be secured in place. It merely drops in over the piston rod 67 and seats against the shoulder 65. The length of the piston rod 67 is dimensioned such that when the actuators are stored in the assembled state before installation on a cylinder valve, the first piston 55 seats against the end wall 45 before the second piston 59 contacts the pressure plate to preclude the application of a direct mechanical force to the pressure plate.

While specific embodiments of the invention have been described in detail, it will be appreciated by those skilled in the art that various modifictions and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A pneumatic actuator for a cylinder valve having a valve stem member which is biased away from a valve seat by a first spring to open the valve, said actuator comprising:

a hollow cylindrical housing having an end wall at one end thereof;

connection means secured to the end wall of the actuator housing mounting said actuator on the cylinder valve, said connection means and end wall defining an aperture through which said valve stem member extends;

a first piston slidable in the actuator housing and forming with said end wall a first actuator chamber;

a second piston slidable in said actuator housing with the first piston between the second piston and said end wall;

a pressure plate in said cylindrical housing between the first and second pistons forming with the second piston a second actuator chamber and fixing the boundary of the second actuator chamber relative to the end wall;

biasing means generating a biasing force biasing said second piston toward said end wall;

means extending through the pressure plate transmitting the biasing force applied to the second piston to the first piston biasing said first piston against the valve stem member and closing said valve stem against an opening force generated by said first spring; and means introducing pressurized fluid into one of said actuator chambers, said means extending through said pressure plate defining a passage interconnecting said first and second actuator chambers such that the pressurized fluid is introduced into both actuator chambers exerting a force against both pistons and generating a combined force overcoming said biasing force of the biasing means whereby said first spring opens said valve.

2. The pneumatic actuator of claim 1 wherein said pressure plate floats inside the cylindrical housing and including stop means fixing the minimum distance between the pressure plate and the end wall.

3. The pneumatic actuator of claim 2 wherein said stop means comprises an internal shoulder in the cylindrical housing against which said pressure plate seats.

4. The pneumatic actuator of claim 3 wherein said first piston and said pressure plate define a bleed chamber therebetween within the cylindrical housing and wherein said cylindrical housing defines a bleed port venting said bleed chamber to atmosphere, said actuator including seals between each of the pistons and said cylindrical housing, between the pressure plate and the cylindrical housing and between the pressure plate and said means extending through the pressure plate between said pistons.

5. The pneumatic actuator of claim 1 wherein said means extending through the pressure plate comprises a piston rod secured to the lower piston and bearing against said upper piston.

6. The pneumatic actuator of claim 5 wherein said passage extends axially through said piston rod and including means on one end of the rod forming a flow path between the end of the rod and said second piston through which fluid passes between said passage in the piston rod and said second actuator chamber.

7. The pneumatic actuator of claim 6 wherein the length of said piston rod is dimensioned such that said first piston seats against the end wall before the second piston seats against the pressure plate.

8. The pneumatic actuator of claim 6 wherein said pressure plate floats within the cylindrical housing and wherein said cylindrical housing defines an internal shoulder against which said pressure plate seats when pressurized fluid is introduced into said second actuator chamber.

9. The pneumatic actuator of claim 8 wherein said biasing means comprises disc type compression springs and a cap secured to the end of said cylindrical housing opposite said end wall compressing the compression springs against said second piston.

10. In combination, a valve including a valve body, said valve body defining an inlet passage and a valve chamber forming together a valve seat, and an outlet passage communicating with the valve chamber, a valve stem member slidable in said valve chamber between a closed position against the valve seat and an open position spaced from the valve seat, and first spring means biasing said valve stem member to the open position, and a valve actuator comprising a cup shaped housing having an end wall defining an aperture, means securing the end wall of the actuator housing to the valve body with the valve stem member extending through said aperture, a first piston slidable in the cup shaped housing and forming with said end wall a first actuator chamber, a floating pressure plate slidable in said housing and forming with the first piston a bleed chamber, stop means forming a stop against which the floating plate seats in the direction of the end wall, a second piston slidable in the housing and forming with the floating pressure plate a second actuator chamber, a piston rod extending between said first and second pistons and slidable through said pressure plate, said piston rod and first piston defining a passage extending between said first and second actuator chambers, biasing means biasing said second piston and through said piston rod said first piston against said valve stem member to bias the valve stem member to the closed position; and means for introducing a pressurized fluid into one of said chambers and through said passage through said piston rod into said other chamber to exert a force against each piston which combine to overcome the biasing force applied by said biasing means to the second piston, whereby said first spring moves said valve stem member to the open position.

11. The combination of claim 10 in which said stop means comprises an internal shoulder in said cylindrical housing.

12. The valve of claim 11 in combination with a gas cylinder to which the valve is secured and a transport cap which fits over the valve and said actuator and is secured to said gas cylinder.

* * * * *